(12) United States Patent
Stéphane et al.

(10) Patent No.: US 6,871,916 B2
(45) Date of Patent: Mar. 29, 2005

(54) SENSOR MODULE INTEGRATING BOTH THE MEASUREMENT OF A ROD TRAVEL AND MEASUREMENT OF THE FORCE EXERTED ON SAID ROD

(75) Inventors: Gendrin Stéphane, Bruz (FR); Jean Fourcade, Champs sur Marne (FR); Thierry Pasquet, Livry Gargan (FR)

(73) Assignee: Robert Bosch GmbH, Stuttgart (DE)

( * ) Notice: Subject to any disclaimer, the term of this patent is extended or adjusted under 35 U.S.C. 154(b) by 466 days.

(21) Appl. No.: 09/979,816

(22) PCT Filed: Sep. 6, 2001

(86) PCT No.: PCT/FR01/02762
§ 371 (c)(1),
(2), (4) Date: Nov. 16, 2001

(87) PCT Pub. No.: WO02/23135
PCT Pub. Date: Mar. 21, 2002

(65) Prior Publication Data
US 2004/0012253 A1 Jan. 22, 2004

(30) Foreign Application Priority Data
Sep. 15, 2000 (FR) .......................................... 00 11837

(51) Int. Cl.⁷ ................................................ B60T 8/34
(52) U.S. Cl. ...................................... 303/113.4; 73/132
(58) Field of Search ........................ 73/132; 324/207.2; 303/113.4, 155

(56) References Cited
U.S. PATENT DOCUMENTS

| | | | | |
|---|---|---|---|---|
| 3,891,918 A | * | 6/1975 | Ellis ........................ 324/207.16 |
| 4,788,526 A | * | 11/1988 | Eckstein et al. ............. 340/467 |
| 5,515,041 A | * | 5/1996 | Spillman, Jr. .......... 340/870.31 |
| 5,563,355 A | * | 10/1996 | Pluta et al. ............. 73/862.625 |
| 5,658,055 A | * | 8/1997 | Dieringer et al. ......... 303/114.3 |
| 5,772,290 A | * | 6/1998 | Heibel et al. ............. 303/113.4 |
| 6,422,125 B1 | * | 7/2002 | Fulks ........................ 91/376 R |
| 6,612,659 B2 | * | 9/2003 | Fulks et al. .............. 303/113.4 |

* cited by examiner

Primary Examiner—Robert A. Siconolfi
(74) Attorney, Agent, or Firm—Leo H. McCormick, Jr.; Warren Comstock

(57) ABSTRACT

A sensor module including a processing unit, a stroke sensor and a force sensor (3) for obtaining data relating to both a force exerted on an axially-moving rod (1) and the travel of the rod through a determination of the position of the piston (2) with respect to the rod (1). The sensor module is characterized by a first stationary electrical coil (5) that is arranged about the piston (2) and the rod (1) and a second moving electrical coil (6) that is disposed about the rod (1) and connected to the force sensor (3). The first (5) and second (6) coils are coaxial and as a result induced oscillatory voltage within the stationary coil (5) generates an eddy current within the piston (2) that permit a measurement of the stroke of the piston (2) by means of eddy-current signal received by the stroke sensor using the piston (2) as a test body, and supplying the force sensor with electrical power through the second moving electrical coil (6). The first stationary electrical coil (5) is further used as a medium for the transmission of an electrical measurement signal (S) that is generated by the force sensor (3).

3 Claims, 1 Drawing Sheet

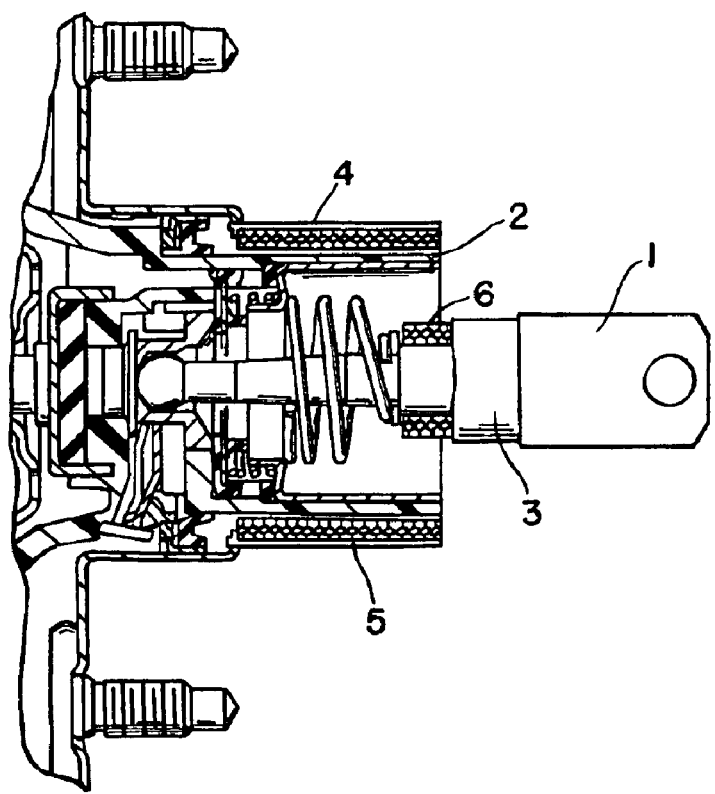

SENSOR MODULE INTEGRATING BOTH THE MEASUREMENT OF A ROD TRAVEL AND MEASUREMENT OF THE FORCE EXERTED ON SAID ROD

This invention relates to a sensor module integrating both the measurement of the travel of a brake pedal and the measurement of the force exerted on said pedal.

BACKGROUND OF THE INVENTION

A booster, or a pneumatic servomotor for an assisted braking, comprises a rigid jacket, made up of two shells forming, on the one hand, the cover and, on the other hand, the cylinder, which are assembled by crimping. Inside the jacket of the pneumatic servomotor for an assisted braking, a variable-volume front chamber is separated from a variable-volume rear chamber by a tight flexible diaphragm and by a rigid skirt driving a pneumatic piston which bears, through a control rod, on the primary piston of a tandem master cylinder of a hydraulic braking system. The front chamber, directed towards the tandem master cylinder, is hydraulically connected to a vacuum source whereas the rear chamber is hydraulically connected, using a valve control, to a propellant fluid source, typically atmospheric-pressure air.

In this type of servomotors, it would be useful to carry out a measurement of the force exerted on the control rod of said pneumatic servomotor for an assisted braking, on actuation, and to transmit such information to a processing unit so as to supply the braking system with input data regarding the force, which is actually applied to the brake. In the same way, it would be a good thing to be able to measure such forces in a master cylinder, directly connected to the brake pedal.

The travel of the pedal on the actuation of the brake, should also be determined.

Generally, one uses, on the one hand, a force sensor for the control rod and, on the other hand, in the case of a servomotor, the pneumatic piston as a test body of an eddy-current stroke sensor and, insofar as a master cylinder is concerned, the primary piston is used for this purpose.

Yet, a stroke sensor plus a force sensor make the structure heavier and more intricate.

SUMMARY OF THE INVENTION

Therefore, it is the main object of the present invention to provide a sensor module integrating both function, namely that of a force sensor and that of the braking travel sensor, so as to supply the braking system with input data, which are as full as possible, while nonetheless keeping a simple and economical structure.

To this end, the subject of this invention is a sensor module, comprising a processing unit, a stroke sensor and a force sensor, and capable of determining, inside the pneumatic servomotor for an assisted braking or inside the associated master cylinder, data concerning both the force applied to the brake pedal, through the determination of the force exerted on an axially-moving rod, and the travel of said rod, by the determination of the position of the piston coupled to the rod, characterised in that it comprises a first stationary electrical coil, which is arranged about said piston and said rod, and a second moving electrical coil, disposed about the rod and connected to the force sensor, wherein said coils are coaxial and an induced oscillatory voltage within said stationary coil generates an eddy current within said piston, thus permitting the measurement of the stroke of said piston by means of the eddy-current stroke sensor using the piston as a test body, and supplying the force sensor with electrical power through the moving coil, said stationary coil being further used as a medium for the transmission of an electrical measurement signal, generated by said force sensor.

Thus, in an advantageous manner, the data acquisition at the force sensor comes from the coaxial coils and it is therefore a wireless transmission, which does not require any wired connections for both the power supply of the force sensor and the collection of the force measurement signal, throughout the stroke of the control rod, with the result that the structure is lighter and simplified. Besides, the components of such wireless transmission, more especially the stationary coil, are also used for the eddy-current generation inside the primary piston, so as to implement the second function of the sensor module according to this invention.

Advantageously too, the sensor module according to the present invention integrates, within one and only module, the data acquisition concerning the pedal stroke and the data acquisition regarding the force exerted on said pedal, while using the same processing electronic devices, the same connecting devices and the same stationary coil, whatever the desired function may be: either the measurement of both input parameters or the measurement of the one or the other of them.

Preferably, the stroke of the control rod ranges from 40 to 50 mm.

Other features and advantages of the present invention will be apparent from the following detailed description of an embodiment of the invention, when taken in conjunction with the accompanying drawing.

BRIEF DESCRIPTION OF THE DRAWING

The single FIGURE is a partial sectional view of a pneumatic servomotor for an assisted braking, comprising a sensor module according to this invention.

DETAILED DESCRIPTION OF THE INVENTION

The rod 1 is axially movable inside the piston body 2, in the pneumatic servomotor for an assisted braking, and a force sensor 3 is mounted on said rod 1.

The rod 1 travels axially in the pneumatic servomotor for an assisted braking and is surrounded with a sleeve 4, in which a first electrical coil 5, the so-called stationary coil, is received and disposed about said rod 1.

A second electrical coil 6, the so-called moving one, is fitted about the rod 1, coaxially with the stationary coil 5, and it is connected to the force sensor 3.

The stationary coil 5 is supplied with a sinusoidal voltage from the processing unit U and it generates a flux A, varying inside the moving coil 6. It results in an induced voltage across said moving coil 6, which is connected to the force sensor 3 for the voltage supply of the latter.

When the sensor 3 is active, an electrical signal S is emitted in the moving coil 6, the amplitude, the frequency or the duty cycle of which depends on the force, which is exerted on the rod 1. Such electrical signal S is received by the stationary coil 5, which is connected to the processing unit U, which the signals S are sent to.

Preferably, the rod 1 is made of steel and the radial air gap between the coils 5, 6 ranges from 0.5 to 2 mm.

Preferably too, the stationary coil 5 is longer than the moving coil 6, so that the induced voltage in the moving coil 6 may vary to a lesser extent throughout the travel of the rod 1.

When a voltage is applied to the stationary coil 5, said coil generates en eddy current F within the primary piston 2, so as to measure the position of the primary piston 2, which is used as a test body for the eddy-current stroke sensor.

The present invention mainly applies to the design and manufacturing of braking systems for motor vehicles and, especially, for passenger cars, and it applies, more particularly, to the implementation of pneumatic servomotors for an assisted braking, comprising a sensor module as per the above description, and/or master cylinders, more particularly tandem master cylinders comprising the above-described sensor module.

We claim:

1. A sensor module including a processing unit, a stroke sensor and a force sensor for obtaining data relating to both a force exerted on an axially moving rod and the travel of said rod by determination of the position of a piston within a housing for a servomotor with respect to said rod, said sensor module being characterized by a first stationary electrical coil that is located with a sleeve that extends from said housing and surrounds a portion of said piston and said rod; and a second moving electrical coil that is disposed about the rod and is connected to said force sensor, said first and second coils being coaxial and spaced apart from each other to define a radial air gap and on said first stationary electrical coil being supplied with a sinusoidal voltage from said processing unit generating a flux that varies inside said second moving electrical coil and as a result a voltage is induced across said second moving electrical coil, said first stationary electrical coil being longer than said second moving electrical coil so that any induced voltage in said second moving electrical coil varies to a lesser extent throughout movement of said second moving electrical coil with said first stationary coil such that voltage supplied of said first stationary electrical coil is a function of the input from said second moving coil to said force sensor.

2. The sensor module according to claim 1, further characterised in that said radial air gap has ranges of between 0.5 to 2 mm.

3. The sensor module according to claim 1, further characterised in that a stroke of said axially-moving rod ranges from 40 to 50 mm.

* * * * *